(12) United States Patent
Irwin (10) Patent No.: US 9,197,422 B2
(45) Date of Patent: Nov. 24, 2015

(54) SYSTEM AND METHOD FOR DIFFERENTIAL ENCRYPTION

(71) Applicant: Raytheon Company, Waltham, MA (US)

(72) Inventor: Jess M. Irwin, McKinney, TX (US)

(73) Assignee: Raytheon Company, Waltham, MA (US)

( * ) Notice: Subject to any disclaimer, the term of this patent is extended or adjusted under 35 U.S.C. 154(b) by 120 days.

(21) Appl. No.: 13/748,789

(22) Filed: Jan. 24, 2013

(65) Prior Publication Data

US 2014/0205089 A1   Jul. 24, 2014

(51) Int. Cl.
*H04L 9/32* (2006.01)
*H04L 9/08* (2006.01)
*H04L 29/06* (2006.01)

(52) U.S. Cl.
CPC .............. *H04L 9/3278* (2013.01); *H04L 9/085* (2013.01); *H04L 9/0819* (2013.01); *H04L 9/0866* (2013.01); *H04L 9/0877* (2013.01); *H04L 63/0428* (2013.01)

(58) Field of Classification Search
CPC .............................. H04L 9/085; H04L 9/3278
USPC ........................................................... 380/44
See application file for complete search history.

(56) References Cited

U.S. PATENT DOCUMENTS

| | | | |
|---|---|---|---|
| 5,796,830 A * | 8/1998 | Johnson et al. | 380/286 |
| 5,953,420 A * | 9/1999 | Matyas et al. | 713/171 |
| 5,963,646 A * | 10/1999 | Fielder et al. | 380/259 |
| 6,677,888 B2 * | 1/2004 | Roy | 342/36 |
| 6,934,392 B1 * | 8/2005 | Vanstone | 380/278 |
| 8,510,559 B2 * | 8/2013 | Guccione et al. | 713/171 |
| 8,756,439 B1 * | 6/2014 | Jannson et al. | 713/193 |
| 8,848,905 B1 * | 9/2014 | Hamlet et al. | 380/35 |
| 2002/0062451 A1 * | 5/2002 | Scheidt et al. | 713/201 |
| 2003/0030581 A1 | 2/2003 | Roy | |
| 2003/0081785 A1 * | 5/2003 | Boneh et al. | 380/277 |
| 2004/0208316 A1 * | 10/2004 | Wack et al. | 380/44 |

(Continued)

FOREIGN PATENT DOCUMENTS

| WO | WO-2009/024913 A2 | 2/2009 |
|---|---|---|
| WO | WO-2014116956 A2 | 7/2014 |
| WO | WO-2014116956 A3 | 7/2014 |

OTHER PUBLICATIONS

Just Fast Keying: Key Agreement in a Hostile Internet; William Aiello et al.; ACM Transactions on Information and System Security, vol. 7, No. 2, May 2004, pp. 1-30.*

(Continued)

*Primary Examiner* — James Turchen
(74) *Attorney, Agent, or Firm* — Schwegman Lundberg & Woessner, P.A.; Gregory J. Gorrie (57) ABSTRACT

Some embodiments include a Trusted Security Module that creates secure connections using a set of split keys. Some embodiments include the creation of remote and local keys that are distributed to multiple devices. When the devices wish to communicate with each other, the remote and local keys are combined into connection keys to encrypt and decrypt messages. The remote and local keys may be combined in a variety of ways, including appending the remote key to the local key. A key mask may be used to create a connection key by using various combinations of bits from the remote key and from the local key. Other embodiments are described.

9 Claims, 11 Drawing Sheets

(56) References Cited

U.S. PATENT DOCUMENTS

| | | | |
|---|---|---|---|
| 2005/0169479 A1* | 8/2005 | Ekstrom | 380/277 |
| 2005/0276414 A1* | 12/2005 | Harrison et al. | 380/30 |
| 2006/0034457 A1* | 2/2006 | Damgaard et al. | 380/44 |
| 2006/0256963 A1* | 11/2006 | Gebotys | 380/205 |
| 2008/0115199 A1* | 5/2008 | Young et al. | 726/6 |
| 2010/0154053 A1* | 6/2010 | Dodgson et al. | 726/19 |
| 2010/0250936 A1 | 9/2010 | Kusakawa et al. | |
| 2011/0088087 A1* | 4/2011 | Kalbratt | 726/7 |
| 2011/0099623 A1* | 4/2011 | Garrard et al. | 726/14 |
| 2011/0116628 A1* | 5/2011 | Wack et al. | 380/44 |
| 2012/0082312 A1* | 4/2012 | Liu et al. | 380/262 |
| 2013/0089204 A1* | 4/2013 | Kumar et al. | 380/256 |
| 2013/0111209 A1* | 5/2013 | Harkins | 713/171 |
| 2013/0173905 A1* | 7/2013 | Inatomi et al. | 713/150 |
| 2013/0188790 A1* | 7/2013 | Langford et al. | 380/44 |
| 2014/0310527 A1* | 10/2014 | Veugen et al. | 713/171 |

OTHER PUBLICATIONS

Physical Unclonable Functions in Cryptographic Protocols: Security Proofs and Impossibility Results; Marten van Dijk et al.; Apr. 25, 2012.*

Anti-counterfeiting, key distribution, and key storage in an ambient world via physical unclonable functions; Jorge Guanjardo et al.; Springer Science; Oct. 23, 2008.*

"International Application Serial No. PCT/US2014/012960, International Search Report mailed Feb. 5, 2015", 6 pgs.

"International Application Serial No. PCT/US2014/012960, Written Opinion mailed Feb. 5, 2015", 14 pgs.

"International Application Serial No. PCT/US2014/012960, Invitation to Pay Additional Fees and Partial Search Report mailed Nov. 14, 2014", 6 pgs.

"Manual on Detailed Technical Specifications for the Aeronautical Telecommunication Network (ATN) Using ISO/OSI Standards and Protocols", Doc 9880-An/466 Part III, [online]. [retrieved on Oct. 29, 2014]. Retrieved from the Internet: <http://www.icao.int/safety/acp/repository/Doc 9880-Part III-Final.pdf>, (Jan. 1, 2011), 184 pgs.

"Manual on Detailed Technical Specifications for the Aeronautical Telecommunication Network (ATN) Using ISO/OSI standards Part IV-B—Security Services", [online]. [retrieved on Oct. 29, 2014]. Retrieved from the Internet: <http://www.icao.int/safety/acp/repository/Doc9880-Part-IV-B-AmendmentProposalsJuly2011.doc>. (Jul. 2011), 63 pgs.

* cited by examiner

SYSTEM AND METHOD FOR DIFFERENTIAL ENCRYPTION

BACKGROUND

The present invention relates to computer architectures and more particularly to computer architectures with encryption.

The avionics of conventional military and commercial systems is such that multiple embedded systems, i.e., radar, electronics, electro-optical and others, are federated into a platform avionics suite that will be distributed throughout the airframe to facilitate flight of the vehicle and improve the operation of the subsystems. In a modern military platform, disparate security classification guidelines control the dissemination of information from each of those systems, and the external communications to other platforms and services. These systems are connected in contemporary enterprise, sharing and combining the information for exploitation by the platform and its operator. These weapon system platforms operate in a mode known as "System High," even though the majority of information used is unclassified. "System High" is a level that is at least as high as the highest level of information available to the environment. Access to the stored results of any mission must then be manually downgraded to the level of the end user, which is predominately that of a service member without any clearance. Even the use of government validated Cross Domain Solutions is limited by the ambiguity of the information to be released.

The primary approach to comply with DoD Instruction 8500.02 Information Assurance (IA) Implementation and the corresponding 8510.01 DoD Information Assurance Certification and Accreditation Process (DIACAP) is to demonstrate the control of information by documenting its flow such that the three primary requirements of 8500.02 are fulfilled. These primary requirements of Confidentiality, Integrity, and Availability are intended to ensure that the intended user and only the intended user has timely access to the unmodified information based upon its sensitivity and need to know. In the past, physical isolation, a time consuming and expensive process was used for this purpose. With the explosion of information technology and proliferation, logical isolation was proposed for isolation of network information traffic, using Common Internet Protocol Security Option (CIPSO) and Common Architecture Label IPv6 Security Option (CALIPSO). The use of COMSEC encryption with High Assurance Internet Protocol Encryptor (HAIPE) devices also provides isolation of network traffic. These approaches do not satisfy the requirement of fine-grained security where a large community of users need to share information of various levels of security without allowing an individual insider threat to expose information and place everyone at risk.

Hence, a need remains in the art for an inexpensive security solution for environments ranging from integrated avionics to Global Enterprises where identity and privacy can be maintained.

DETAILED DESCRIPTION

Illustrative embodiments and exemplary applications will now be described with reference to the accompanying drawings to disclose the advantageous teachings of the present invention.

While the present invention described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
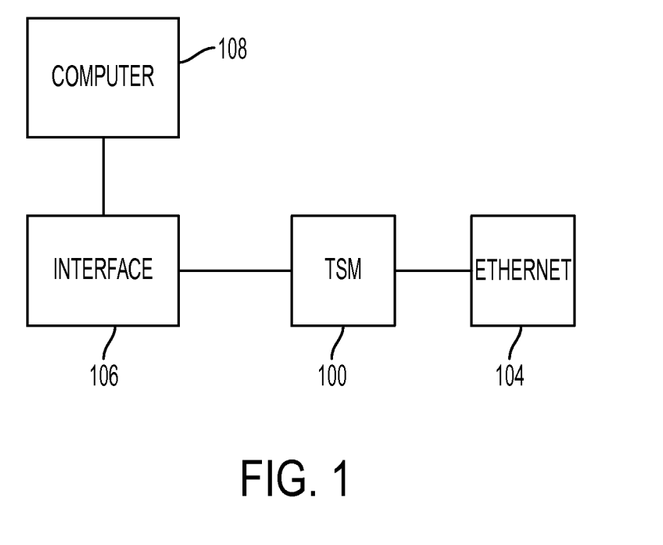
FIG. 1 is a block diagram of a system level diagram of the present invention.

FIG. 1 is a simplified block diagram of the integration of an embodiment of present invention into a target system. As shown in the FIG. 1, the concept is based upon replacing a processing node's Network Interface Controller with an enhanced Trusted Security Module (TSM) encryption component. More particularly, a computer 108, containing standard elements of a computer, such as a processor, memory, and the like, is coupled to an interface 106. This interface 106 may take many different forms, including PCI interfaces, PC Cards, and the like. Interface 106 is coupled to Trusted Security Module (TSM) 100. The configuration and operation of TSM 100 will be detailed later in this application. TSM 100 may be coupled, via Ethernet 104, to other computing systems via a variety of different methods, including the Internet. Although TSM 100 is described as being a part of a Network Interface Controller, it should be understood that TSM 100 may be incorporated into a number of different computing components.

Figure 2:
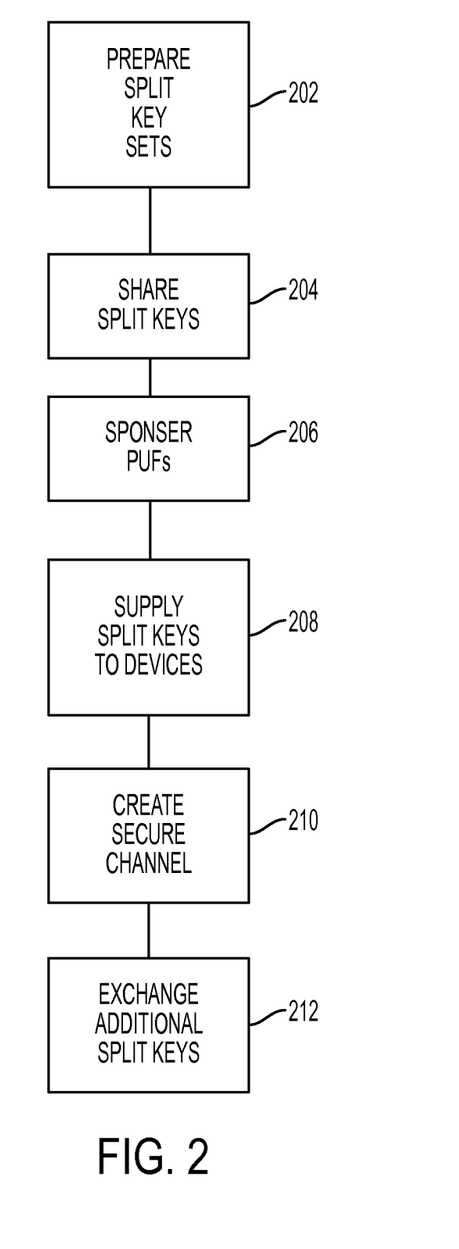
FIG. 2 is a flow chart providing an overview of the operation of an embodiment.

FIG. 2 presents a flow chart providing an overview of the operation of an embodiment to create a secure connection between two devices. Keys can be used to encrypt data. A Physically Unclonable Function (PUF) prepares a unique set of values that are then partitioned into split key sets that include a remote key and a local key (202). Physically Unclonable Functions are uniquely and randomly generated values that typically result from manufacturing process variations. For example, the physically unclonable function may be created using physical properties of the devices to be coupled. Given the size of the field of values, studies show that the likelihood of similar values between devices is extremely low. The keys described herein may be 256 bits wide, with split keys that are half that size (128 bits). It should be understood that the concepts described herein may be used with full keys of any width and split keys that may or may not be half the size of the full keys.

Even in the event of similar value sets, the combination of split key sets from pairs of components that are established in the association process creates a larger field of values and decreases the likelihood of matching keys. Subsets of these split key sets may be shared with and stored in similarly provisioned devices to form associations between those devices (204). A third device with the same capability is able to "sponsor" these Physically Unclonable Functions (206). Sponsoring devices may be held at a secure facility associated with an authenticating authority. An initial set information related to the sponsors may be loaded into the devices as part of the manufacturing process, at which time a limited amount of the split key information is saved for communicating with these sponsors in a secure fashion. Much like a Public Key Infrastructure Certificate Authority, the sponsor facility may exist within equipment similar to those devices provisioned with the end device. After a sponsor introduces two devices to each other, and supplies an initial set of split keys to each device (208), a secure communication channel is created between the two devices (210). Communication may be initiated between the devices with an exchange of encrypted identification messages. Since the sponsor has access to the limited set of initialization keys for each device in the introduction, the introduction of the sponsor is secure. During the introduction, the sponsor provides each participant with a split key corresponding to the party being introduced. Within the message header, the unencrypted IP address is used to identify the domain of the devices, whereupon the encrypted message that is based upon both of the devices' identities is used to determine the association in each device.

The introduction process is completed by exchanging the remaining split keys to each device through the mutually secured channels (212). Subsequent messages are encrypted using connection keys that are generated by the random combination of split keys from the association table of a shared split key set. The receiving device identifies the connection key from the potential split key combinations it has previously shared with the sending device. The initial combination of split keys may be a simple process, such as by appending the remote key to the local key. Once an association is established between the participants and a key mask variable is established, the key mask variable and its complement are both used to spread the split keys from the original 128 bits to the full key length of 256 bits, where each bit of the key mask indicates which corresponding ordinal bit of the split key is used. For example, the key mask may indicate that each bit alternates from one split key to the other. Or the key mask may indicate that two bits are used from one split key, then two bits are used from the other split key.

To use a simplified example, if a remote key were four bits in length and a local key were four bits in length, an 8-bit key mask would be used. Each bit of the key mask indicates from which key the bit is to be taken from. A value of 1 in a particular bit of the key mask may indicate the remote key and a value of 0 may indicate to use the local key. Therefore, a key mask of 1111 0000 may indicate that the first four bits of the connection key were from the remote key and the next four bits were from the local key. A key mask of 1010 0101 would indicate that the first bit (from the left) is taken from the remote key, the second bit is taken from the local key. Thereafter, each 1 in the key mask would indicate the use of the next bit of the remote key and each 0 would indicate the use of the next bit of the local key. It should be understood that the manner in which the split keys are combined is not necessarily limited to the methods described.

During typical operation, each message may be encrypted with a connection key formed by the combination of the split keys into connection keys. This method of key combination results in a very large (theoretically infinite) set of keys that are distinct from those generated between any other pair of devices. Since split keys are only completely shared through the process described with respect to FIG. 2 and never reused, a message that is intercepted is encrypted and provides no practical benefit to "bad actor." Since the entire process is independent of the infrastructure and processing applications, the enhanced NIC device functions in a manner that is completely transparent to the rest of the system. Communication with disadvantaged or legacy devices bypasses the entire mechanism and provides for independent unsecured operation.

Figure 3:
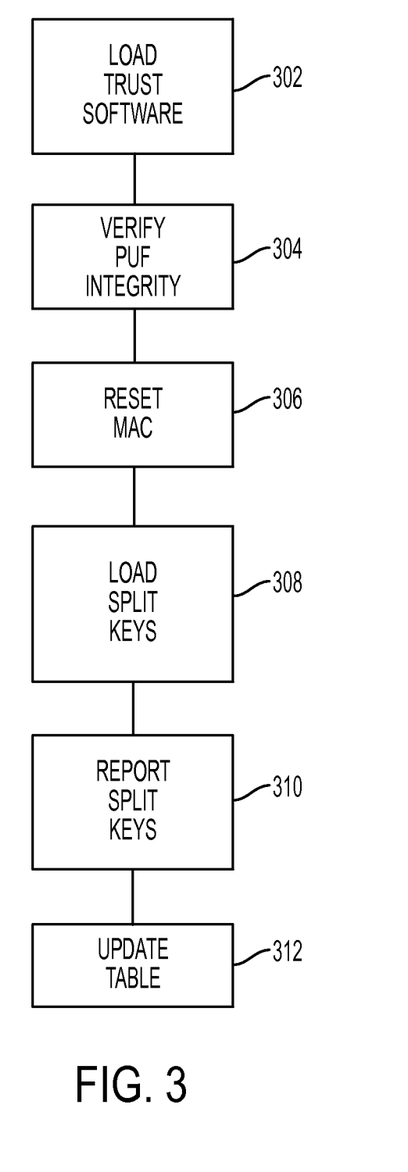
FIG. 3 is a flow chart illustrating the operation of the initial characterization of an embodiment.

FIG. 3 is a flow chart illustrating the operation of the initial characterization of an embodiment of TSM 100. At 302, the trust algorithm software is loaded into memory. Thereafter, the integrity of the Physically Unclonable Functions (PUFs) is validated (304). The MAC is then reset (306). Thereafter, the initial set of split keys is loaded (308) and reported to the host device (e.g., computer 108) (310). The table with the split keys, located within TSM 100, is then updated (312).

Figure 4:
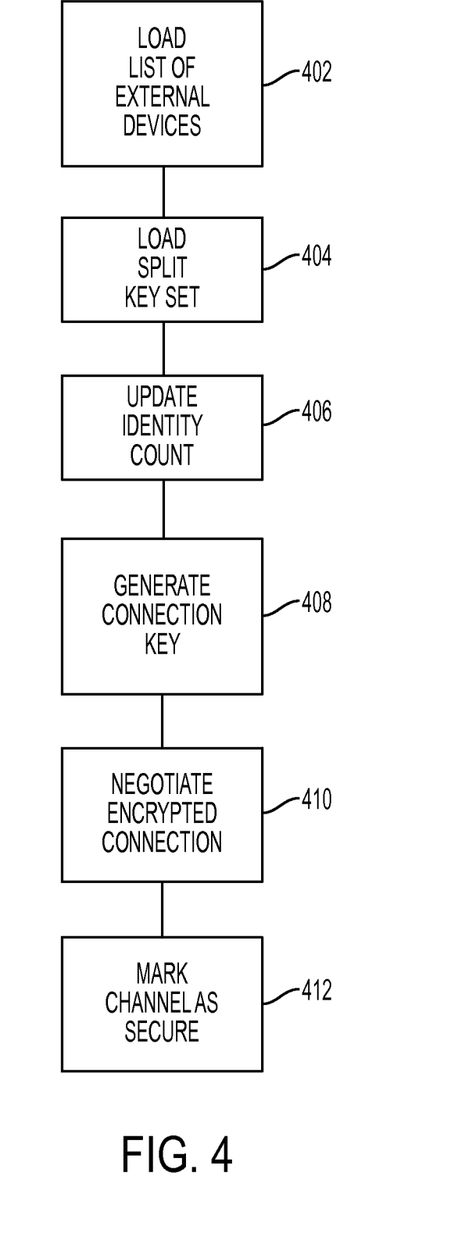
FIG. 4 is flow chart illustrating the initialization of an embodiment when an external device is attached.

FIG. 4 is flow chart illustrating the initialization of an embodiment when an external device is attached, resulting in a negotiation between the devices that establishes a trusted channel. A table containing the list of approved external devices in the list identities is read by TSM 100 to determine if the external device is in the list (402). TSM 100 loads remote split keys and local split keys for each approved external device (404). Then, TSM 100 updates the identity count (406). The identity count is used later to limit the set of approved connections for communication. TSM 100 generates a connection key for the external device from local and remote key splits (408). TSM 100 negotiates an encrypted connection using the connection key (410). Thereafter, the channel is marked as secure and index is updated (412). The communication index may provide a pseudo-random modification to the key mask and the selection of the particular key pairs to be used for the next message in a fashion only the two devices know and share.

Figure 5:
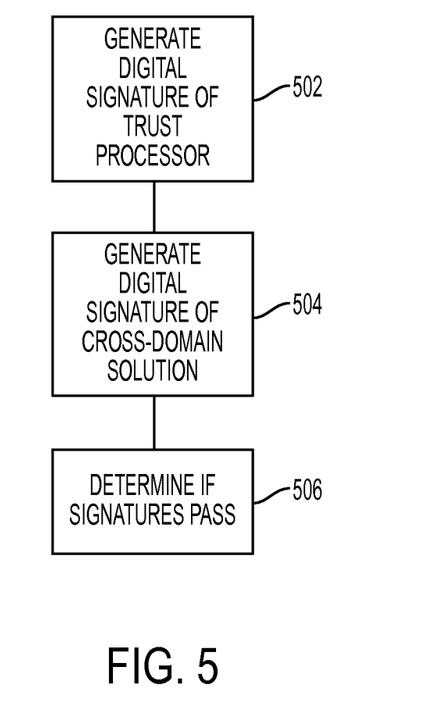
FIG. 5 is a flow chart illustrating the authentication of an instance of the present invention.

FIG. 5 is a flow chart illustrating the authentication process. A digital signature of the trust processor software is generated and compared with the stored digital signature of the trust processor stored within the TSM 100 (502). Thereafter, a digital signature of other support software within the TSM is generated then compared with the stored digital signature (504). If either signature fails, the failure is recorded and the authentication stops (506).

Figure 6:
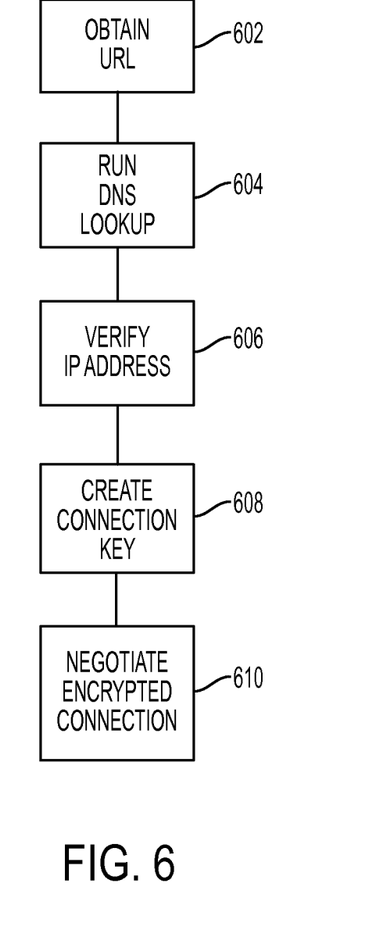
FIG. 6 is a flow chart illustrating the adoption of an embodiment into an external network within a controlled environment.

FIG. 6 is a flow chart illustrating the adoption of a device into an external network in a controlled fashion. The external network may include a website, a social network, or the like. The Uniform Resource Locator (URL) of an external network to be connected to is obtained. (602). A Domain Name System (DNS) lookup is run on the URL, which will return an Internet Protocol (IP) address. (604). The IP address returned from the DNS lookup is validated to be a valid IP address by comparing the IP address to a table of valid IP addresses (606). If the IP address is validated, a remote key and local key are combined to create a connection key (608). Thereafter, the connection key is used to negotiate an encrypted connection to the external network (610).

Figure 7:
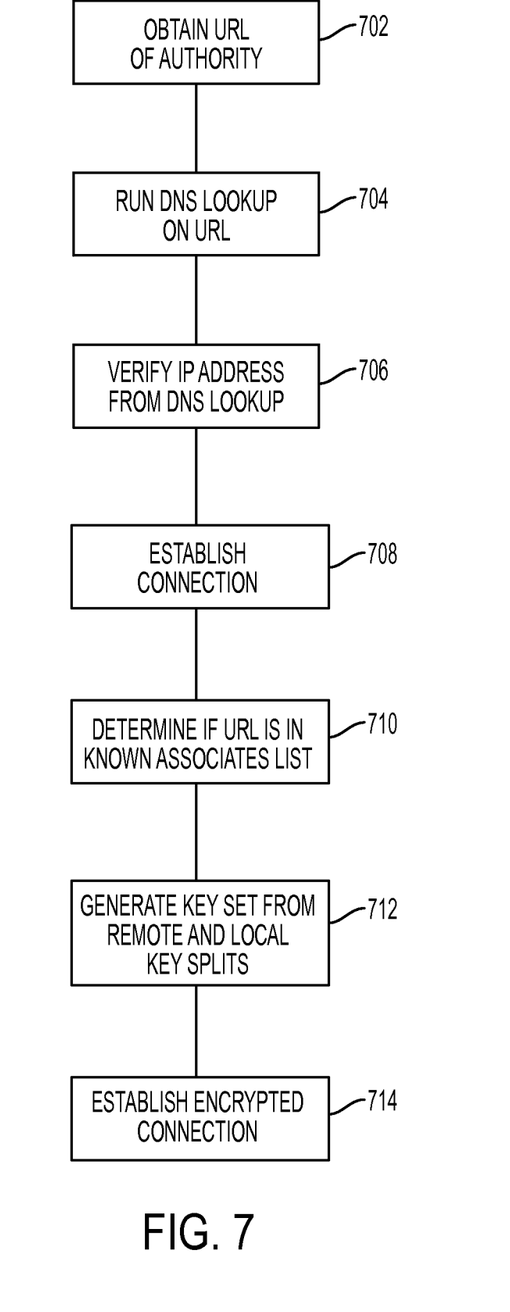
FIG. 7 is a flow chart illustrating the establishment by an administrator of a new context and the rules associated for the exchange of information between other existing contexts within an instance of the present invention.

FIG. 7 is a flow chart illustrating the establishment by an administrator of a new context and the rules associated for the exchange of information between other existing contexts within an instance of the present invention. The URL of an authority to be connected to is obtained from a list. (702). A DNS lookup is run on the URL. (704). The IP address returned from the DNS lookup is validated (706). If the IP address is validated, a connection is established (708). Thereafter, it is determined if the URL is in a known associates list (710). If so, a key set is generated from remote and local key splits (712). Thereafter, an encrypted connection is established to the authority, using the key set generated from the remote and local key (714). If the URL is not in a known associates list, no further steps are performed.

Figure 8:
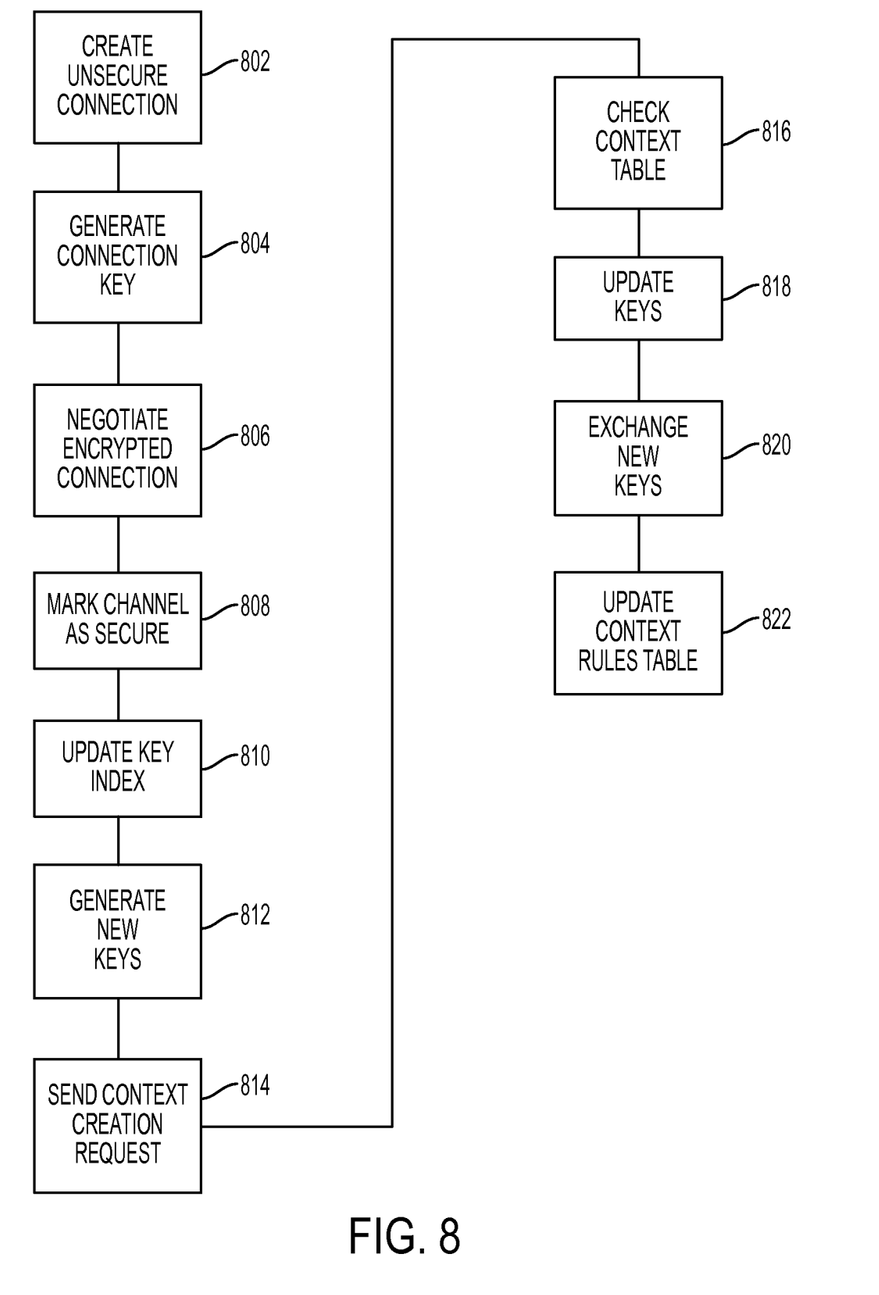
FIG. 8 is a flow chart illustrating the modification of an existing connection context for the exchange of information.

FIG. 8 is a flow chart illustrating the modification of an existing connection context for the exchange of information. First, an unsecure connection is established between TSM 100 and the existing connection (802). A connection key is generated from remote and local split keys (804). An encrypted connection is negotiated between the trust processor and the new associated device (806). This is accomplished in a manner similar to that of creating a VPN connection to a trusted service center. The channel is marked as secure (808) and the key index is updated (810). New connection keys are generated for this connection using the local and remote split keys (812). Then a context creation request is sent to the existing connection (814). This context creation request, much like the establishment of a virtual tunnel or Secure Socket Layer connection, establishes an individual level of privacy between the participants and extends the concept of separation of information flow. The protocol used to negotiate this class of connection is specified by the Open SSL protocol defined by the Internet Engineering Task Force. An example of this form of separation is the separation of public information, proprietary information, and private information that some entities use to identify the importance of data. For each connection in the request, the context table is checked (816). If there is no entry for this associate, the local and remote keys are updated again (818). Updating the keys and the communication key index provides an additional layer of security into the transaction such that each part of the exchange of information is encoded with a new key. The new split key set is exchanged (820) and the context exchange rules are placed into a context rules table (822).

Figure 9:
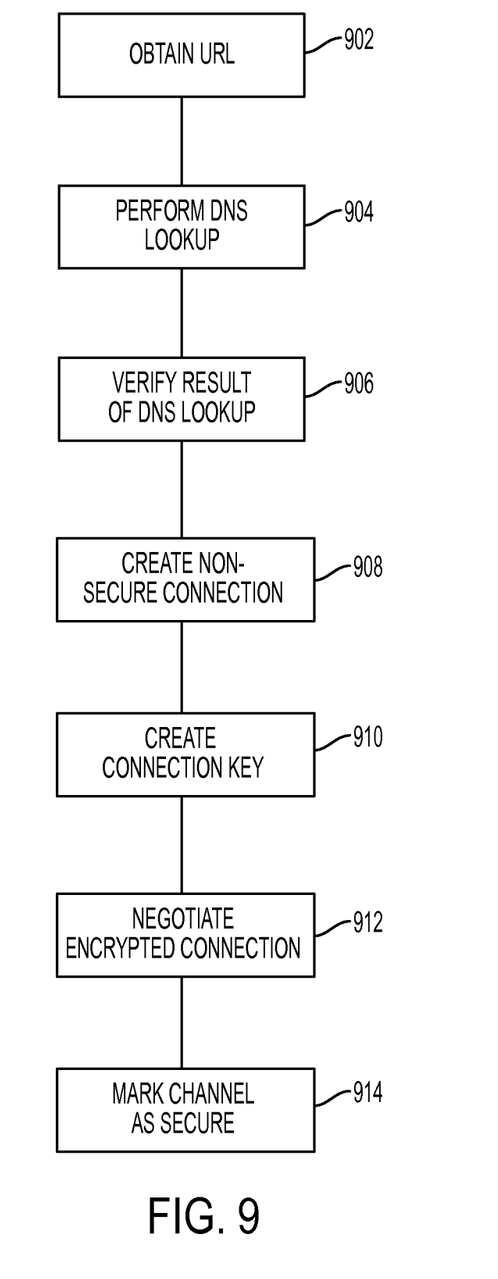
FIG. 9 is a flow chart illustrating how a target can initiate a connection with an associate using an exchange of encrypted identification messages.

FIG. 9 is a flow chart illustrating how a target can initiate a connection with an associate using an exchange of encrypted identification messages. First, the URL of an associate is obtained (902). A DNS lookup is ran on the URL (904). The IP address returned from the DNS lookup is verified as being associated with the URL (906). If the IP address is validated, a non-secure connection is established (908). The URL is cross-referenced to a known associates list. If the associate is known, a remote key and local key are combined to create a connection key (910). Thereafter, the connection key is used to negotiate an encrypted connection to the associate (912). The channel is marked as secure and the key index is updated (914). Thereafter, the steps are repeated for another associate. If the associate is unknown, the connection is rejected.

Figure 10:
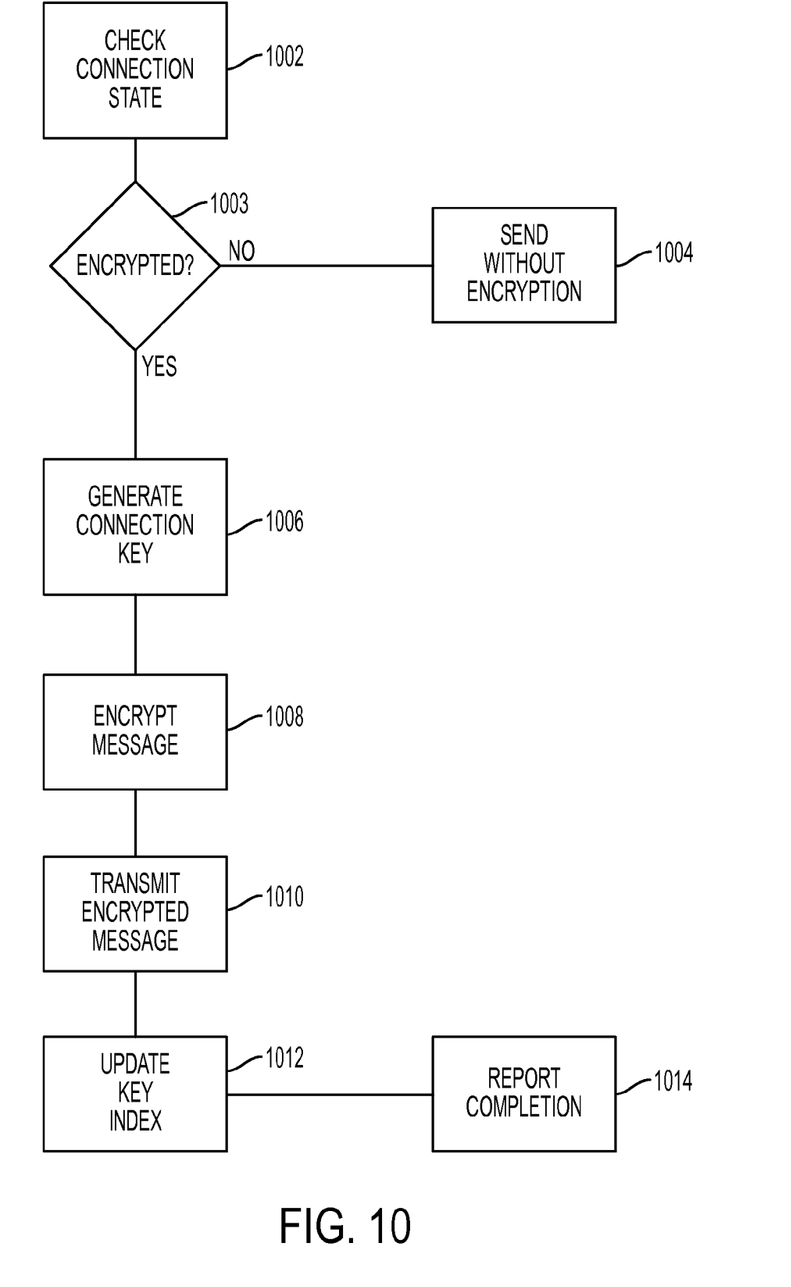
FIG. 10 is a flow chart illustrating how an external device writes an encrypted message to a system using an embodiment.

FIG. 10 is a flow chart illustrating how an external device writes an encrypted message to another device using the capabilities described herein. The trust processor checks the connection state (1002). If the connection is currently unencrypted, the message is sent without encryption (1004). If the connection is encrypted, a connection key is generated using remote and local key splits (1006). Thereafter, the message is encrypted using the connection key (1008). The encrypted message is then transmitted (1010). The key index is updated (1012) and the write is reported as completed (1014).

Figure 11:
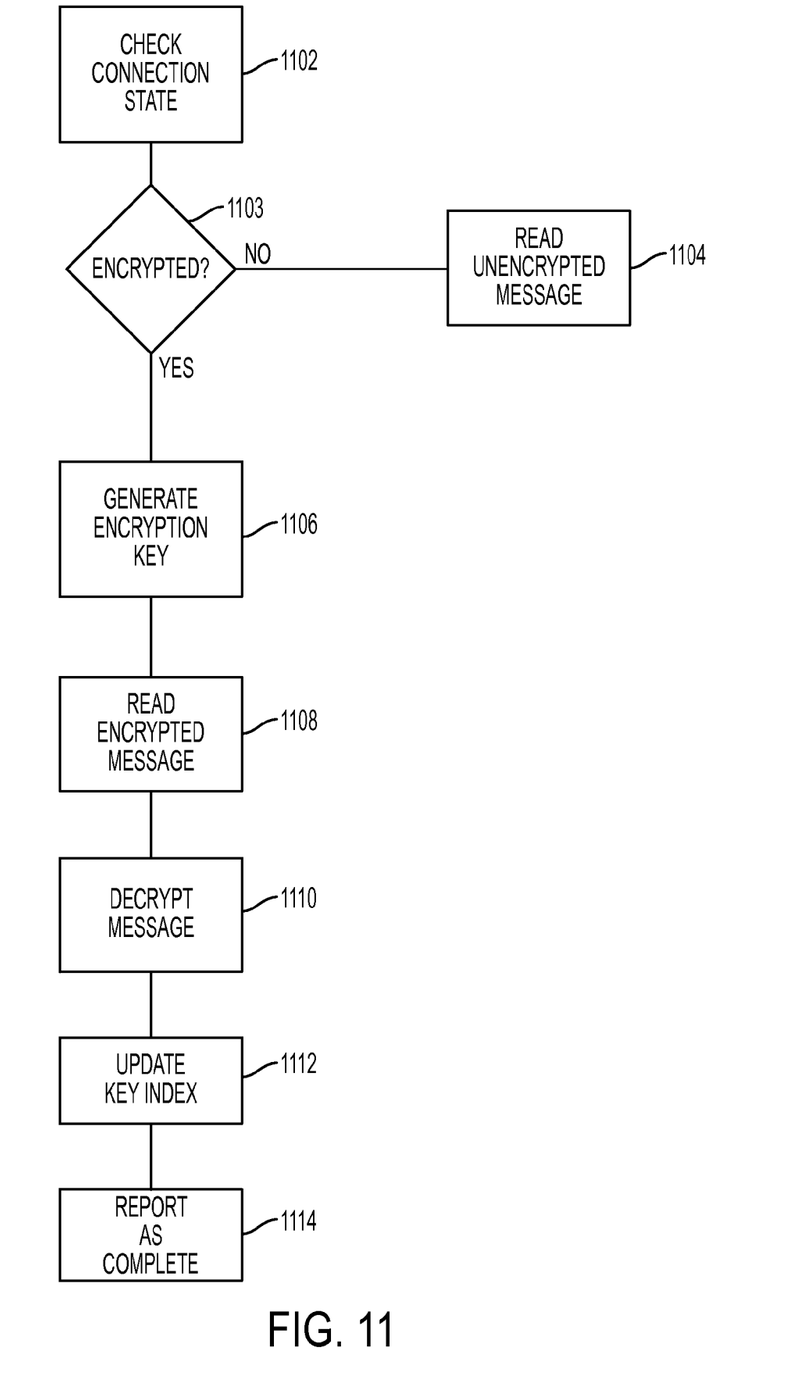
FIG. 11 is a flow chart illustrating how an external system can read an encrypted message from an embodiment.

FIG. 11 is a flow chart illustrating how an external system can read an encrypted message from a device using the capabilities described herein. The trust processor checks the connection state (1102). If the connection is unencrypted, the unencrypted message is read (1104). If the connection is encrypted, a connection key is generated using remote and local key splits (1106). Thereafter, the encrypted message is read (1108), then decrypted using the connection key (1110). The key index is updated (1112) and the write is reported as complete (1114). As mentioned above, the index provides a pseudo-random modification to the key mask and the selection of the particular key pairs to be used for the next message.

The embodiments described above with reference to FIG. 1 through FIG. 11 include: a method for differential encryption comprising: creating a set of remote keys and local keys; supplying a first set of the remote and local keys to a first associated device and a second associated device; coupling the first associated device to the second associated device; exchanging encrypted identification messages between the first associated device and the second associated device; determining the remote and local keys to be used for subsequent communication between the first associated device and the second associated device; and combining the remaining remote and local keys to form a connection key for communication between the first associated device and the second associated device.

Another embodiment may comprise coupling a third associated device to the first associated device; supplying a second set of remote and local keys to the first associated device and the second associated device. The second set of remote and local keys may be different from the first set of remote and local keys.

In another embodiment, supplying a first set of the remote and local keys is performed by a sponsor device. In another embodiment, combining the remote and local keys is performed by a sponsor device.

In another embodiment, the first associated device is contained in an avionics system.

In another embodiment, combining remote keys and local keys to form a connection key may comprise appending a remote key to the end of a local key.

In another embodiment, combining remote keys and local keys to form a connection key may comprise creating a key mask with a length equal to the sum of a length of the local key and a length of the remote key; and using the key mask to create the connection key. Each bit of the key mask may indicate whether to use a bit from the local key or to use a bit from the remote key.

In another embodiment, the local key has a length of 128 bits, the remote key has a length of 128 bits, and the connection key has a length of 256 bits.

A system utilizing differential encryption may comprise: a trusted security module coupled to an interface; wherein the trusted security module is configured to: generate remote keys and local keys; combine remote keys and local keys into connection keys; and use the connection keys to perform differential encryption; wherein, the differential encryption may comprise: sending remote and local keys to an external device; and instructing the external device to combine the remote and local keys to create external device connection keys.

In another embodiment, the trusted security module is coupled to an external interface. The external interface may be an Ethernet interface.

In another embodiment, the trusted security module is configured to: create a key mask with a length equal to the sum of a length of the local key and a length of the remote key; and use the key mask to create the connection key, wherein each bit of the key mask indicates whether to use a bit from the local key or to use a bit from the remote key.

A method of connecting a device to a computer system may comprise: loading a list of approved devices; confirming the device is on the list of approved devices; loading remote and local keys for the device; connecting to the device; generating a connection key using the remote and local keys; and negotiating a connection using the connection key.

In another embodiment, the computer system is part of an avionics system.

A method of connecting a system to an external network may comprise: obtaining the URL of the external network; performing a DNS lookup operation on the URL to return an IP address; validating the IP address; if the IP address is validated, creating a connection key by combining a remote key and a local key; using the connection key to create a secure connection to the external network.

In another embodiment, the external network is accessed using the Internet. In another embodiment, creating a connection key may comprise: creating a key mask with a length equal to the sum of a length of the local key and a length of the remote key; and using the key mask to create the connection key, wherein each bit of the key mask indicates whether to use a bit from the local key or to use a bit from the remote key. In another embodiment, the method may further comprise: generating a new set of remote keys and local keys.

A method of establishing a secure connection between a first device and a second device may comprise: using a physically unclonable function to create a set of remote keys and local keys; sharing the set of remote keys and local keys with the first device and the second device; creating a secure channel between the first device and the second device using the set of remote keys and local keys; and exchanging additional remote keys and local keys between the first device and the second device.

In another embodiment, using a physically unclonable function to create a set of remote keys and local keys may comprise using randomly generated values from physical properties of the first device and the second device.

In another embodiment, the method may further comprise combining remote keys and local keys to form a connection key. In another embodiment, combining remote keys and local keys to form a connection key may comprise: creating a key mask with a length equal to the sum of a length of the local key and a length of the remote key; and using the key mask to form the connection key, wherein each bit of the key mask indicates whether to use a bit from the local key or to use a bit from the remote key.

Thus, the present invention has been described herein with reference to a particular embodiment for a particular application. Those having ordinary skill in the art and access to the present teachings will recognize additional modifications, applications, and embodiments within the scope thereof.

The particular implementations shown and described are illustrative of the invention and its best mode and are not intended to otherwise limit the scope of the present invention in any way. Indeed, for the sake of brevity, conventional data processing, data transmission, and other functional aspects of the system may not be described in detail. Furthermore, the connecting lines shown in the various figures are intended to represent functional relationships and/or physical couplings between the various elements. Many alternative or additional functional relationships or physical connections may be present in a practical system.

In the foregoing description, the invention has been described with reference to specific exemplary embodiments. However, it will be appreciated that various modifications and changes may be made without departing from the scope of the present invention as set forth herein. The description and figures are to be regarded in an illustrative manner, rather than a restrictive one, and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

It is therefore intended by the appended claims to cover any and all such applications, modifications and embodiments within the scope of the present invention.

What is claimed is:

1. A method for differential encryption to allow at least two devices to communicate securely using symmetric keys, the method comprising:

for each device, generating at a sponsor facility, a large set of values using a physically unclonable function (PUF), the PUF based on physical properties related to manufacturing process variations of a device;

securely storing the large set of values generated for a particular device within that device, the securely storing being done at the sponsor facility;

securely storing a subset of the large set of values generated for each device at the sponsor facility, wherein a trusted sponsor device has access to the subset of values for each device, the subsets of values for the devices being a trust base for associations with the trusted sponsor device;

generating a secure pair of channels including a first secure channel between the trusted sponsor device and a first device and a second secure channel between the trusted sponsor device and a second device, the secure pair of channels being located within the sponsor facility, the first secure channel generated based on a first symmetric key determined from the subset of values for the first device, the second secure channel generated based on a second symmetric key determined from the subset of values for the second device;

introducing, by the sponsor device, the first device and the second device to each other by receiving a symmetric disposable key from the first device over the first secure channel and providing the disposable key to the second device over the second secure channel, the disposable key is encrypted by the first device using the first symmetric key and sent to the trusted sponsor device, decrypted by the trusted sponsor device using the first symmetric key, and encrypted by the trusted sponsor device using the second symmetric key and sent to the second device to be decrypted by the second device using the second symmetric key;

configuring the first and second device to generate a temporary secure channel therebetween using the disposable key to encrypt communications therebetween and are configured to exchange a randomly-selected subset of the large set of values over the temporary secure channel, the subset of values comprising split keys used in generation of a larger set of symmetric connection keys for use in subsequent secure communications directly between the first and second devices;

configuring the first and second device to use one or more key masks to create the symmetric connection keys from the exchanged split keys for secure communications directly therebetween, the symmetric connection keys being generated by mapping bits of two split keys to positions based on a key mask, and wherein the randomly-selected subset of values exchanged between the first and second devices becomes a trust base for an association between the first and second device.

2. The method of claim 1 wherein prior to the first and second devices being introduced, the trusted sponsor device is configured to generate the first secure channel of the secure pair of channels at the sponsor facility, by sending a first encrypted message to the first device, and wherein the first device is configured to identify the first encrypted message as being from the trusted sponsor device, and the first device is configured to attempt to decrypt the encrypted message based on the subset of values for the first device that are stored at the sponsor facility to identify the first symmetric key.

3. The method of claim 2 wherein prior to the first and second devices being introduced, the trusted sponsor device is configured to generate the second secure channel of the secure pair of channels at the sponsor facility, by sending a second encrypted message to the second device, and wherein the second device is configured to identify the encrypted message as being from the trusted sponsor device, and the second device is configured to attempt to decrypt the second encrypted message based on the subset of values for the second device that are stored at the sponsor facility to identify the second symmetric key.

4. The method of claim 3 wherein the first device is configured to identify the first encrypted message as being from the trusted sponsor device based on a known IP address of the sponsor device, and wherein the second device is configured to identify the second encrypted message as being from the trusted sponsor device based on a known IP address of the sponsor device.

5. The method of claim 1, wherein the first device and the second device become associated after being introduced and are able to securely communicate using symmetric connection keys unique to their association, wherein when the first device and a third device are associated, the first and third devices are able to securely communicate using symmetric connection keys unique to their association, wherein the first device is further configured to introduce the third device to the second device, without involvement of the trusted sponsor device, to allow the second and third devices to be associated and securely communicate using symmetric connection keys unique to their association.

6. The method of claim 1 wherein the method for differential encryption allows the at least two devices of a plurality of devices to communicate securely using only symmetric keys without use of an asymmetric key.

7. The method of claim 1 wherein the sponsor facility is a secure manufacturing facility, wherein the securely storing comprises securely storing an entire set of the values generated for the particular device based on the PUF for that device, and wherein the securely storing is performed at device manufacture at the sponsor facility.

8. A system for differential encryption configured to allow at least two devices to communicate securely using symmetric keys, the system comprising:

processing circuitry configured to generate at a sponsor facility, for each device, a large set of values using a physically unclonable function (PUF), the PUF based on physical properties related to manufacturing process variations of a device, and securely transferring the large set of values generated for a particular device for secure storage within that device, the securely transferring being done at the sponsor facility;

memory for securely storing a subset of the large set of values generated for each device at the sponsor facility, wherein a trusted sponsor device has access to the subset of values for each device, the subsets of values for the devices being a trust base for associations with the trusted sponsor device, wherein the processing circuitry is configured to:

generate a secure pair of channels including a first secure channel between the trusted sponsor device and a first device and a second secure channel between the trusted sponsor device and a second device, the secure pair of channels being located within the sponsor facility, the first secure channel generated based on a first symmetric key determined from the subset of values for the first device, the second secure channel generated based on a second symmetric key determined from the subset of values for the second device; and introduce, by the sponsor device, the first device and the second device to each other by receiving a symmetric disposable key from the first device over the first secure channel and providing the disposable key to the second device over the second secure channel, wherein during the introducing, the disposable key is encrypted by the first device using the first symmetric key and sent to the trusted sponsor device, decrypted by the trusted sponsor device using the first symmetric key, and encrypted by the trusted sponsor device using the second symmetric key and sent to the second device to be decrypted by the second device using the second symmetric key, wherein the first device and the second device are configured to generate a temporary secure channel therebetween using the disposable key to encrypt communications therebetween and are configured to exchange a randomly-selected subset of the large set of values over the temporary secure channel, the subset of values comprising split keys used in generation of a larger set of symmetric connection keys for use in subsequent secure communications directly between the first and second devices, wherein the randomly-selected subset of values exchanged between the first and second devices becomes a trust base for an association between the first and second device, and wherein the first and second devices are configured to use one or more key masks to create the symmetric connection keys from the exchanged split keys for secure communications directly therebetween, the symmetric connection keys being generated by mapping bits of two split keys to positions based on a key mask.

9. A non-transitory computer-readable storage medium that stores instructions for execution by one or more processors to perform operations for differential encryption to allow at least two devices to communicate securely using symmetric keys, the operations to configured the one or more processors to:

for each device, generate at a sponsor facility, a large set of values using a physically unclonable function (PUF), the PUF based on physical properties related to manufacturing process variations of a device;

securely store the large set of values generated for a particular device within that device, the securely storing being done at the sponsor facility;

securely store a subset of the large set of values generated for each device at the sponsor facility, wherein a trusted sponsor device has access to the subset of values for each device, the subsets of values for the devices being a trust base for associations with the trusted sponsor device;

generate a secure pair of channels including a first secure channel between the trusted sponsor device and a first device and a second secure channel between the trusted sponsor device and a second device, the secure pair of channels being located within the sponsor facility, the first secure channel generated based on a first symmetric key determined from the subset of values for the first device, the second secure channel generated based on a second symmetric key determined from the subset of values for the second device; and introduce, by the sponsor device, the first device and the second device to each other by receiving a symmetric disposable key from the first device over the first secure channel and providing the disposable key to the second device over the second secure channel, the disposable key is encrypted by the first device using the first symmetric key and sent to the trusted sponsor device, decrypted by the trusted sponsor device using the first symmetric key, and encrypted by the trusted sponsor device using the second symmetric key and sent to the second device to be decrypted by the second device using the second symmetric key;

configure the first and second device to generate a temporary secure channel therebetween using the disposable key to encrypt communications therebetween and are configured to exchange a randomly-selected subset of the large set of values over the temporary secure channel, the subset of values comprising split keys used in generation of a larger set of symmetric connection keys for use in subsequent secure communications directly between the first and second devices;

configure the first and second device to use one or more key masks to create the symmetric connection keys from the exchanged split keys for secure communications directly therebetween, the symmetric connection keys being generated by mapping bits of two split keys to positions based on a key mask, and wherein the randomly-selected subset of values exchanged between the first and second devices becomes a trust base for an association between the first and second device.

* * * * *